(12) United States Patent
Yang

(10) Patent No.: US 11,761,572 B2
(45) Date of Patent: Sep. 19, 2023

(54) PIPELINE SEPARATION DEVICE FOR LIQUID-PROPELLANT ROCKET

(71) Applicant: SHAANXI LANDSPACE TECHNOLOGY CO. LTD., Xi'an (CN)

(72) Inventor: Ruikang Yang, Xi'an (CN)

(73) Assignee: SHAANXI LANDSPACE TECHNOLOGY CO. LTD., Xi'an (CN)

( * ) Notice: Subject to any disclaimer, the term of this patent is extended or adjusted under 35 U.S.C. 154(b) by 293 days.

(21) Appl. No.: 17/293,965

(22) PCT Filed: Jun. 10, 2020

(86) PCT No.: PCT/CN2020/095286
§ 371 (c)(1),
(2) Date: May 14, 2021

(87) PCT Pub. No.: WO2021/022899
PCT Pub. Date: Feb. 11, 2021

(65) Prior Publication Data
US 2022/0010912 A1 Jan. 13, 2022

(30) Foreign Application Priority Data

Aug. 8, 2019 (CN) .......................... 201910730746.0

(51) Int. Cl.
*F16L 33/28* (2006.01)
*F16L 55/10* (2006.01)

(52) U.S. Cl.
CPC ........... *F16L 55/1007* (2013.01); *F16L 33/28* (2013.01)

(58) Field of Classification Search
CPC ..... F16L 55/1007; F16L 33/28; F16L 23/036; B64G 1/402; B64G 1/645; B64G 1/401; F42B 15/36
See application file for complete search history.

(56) References Cited

U.S. PATENT DOCUMENTS

| 3,107,419 A | * | 10/1963 | Sandlfer | ................ B25B 27/16 |
| | | | | 29/239 |
| 3,458,219 A | * | 7/1969 | Ludwig | ................... F16L 47/14 |
| | | | | 285/364 |
| 3,645,563 A | * | 2/1972 | Rochelle | ................ F16L 23/02 |
| | | | | 285/317 |

FOREIGN PATENT DOCUMENTS

| CN | 110631432 A | | 12/2019 | |
| GB | 2554463 A | * | 4/2018 | ............. B23P 19/10 |
| JP | 2017110760 A | * | 6/2017 | ............. F16L 21/04 |

OTHER PUBLICATIONS

International Search Report issued in corresponding International Application No. PCT/CN2020/095286; dated Sep. 22, 2020; State Intellectual Property Office of the P.R. China, Beijing, China, 6pgs.

(Continued)

*Primary Examiner* — Zachary T Dragicevich
*Assistant Examiner* — James A Linford
(74) *Attorney, Agent, or Firm* — HAUPTMAN HAM, LLP

(57) ABSTRACT

A pipeline separation device for liquid-propellant rocket comprising a first flange pipeline, a second flange pipeline, a clamping unit, a push-and-pull unit and an actuation unit. The first flange pipeline and the second flange pipeline dock along a first direction, a docking end surface docking with each other is limited by the clamping unit, and end surfaces opposite to each other after docking of the first flange pipeline and the second flange pipeline are respectively used for connecting with different medium pipelines; the actua- (Continued)

tion unit is used for pushing the push-and-pull unit so that the clamping unit relieves limit on the docking end surface. Being provided with a clamping unit and an actuation unit, the pipeline separation device for liquid-propellant rocket is capable of quickly pushing the clamping unit out when the actuation unit works, thereby relieving the limit on the first flange pipeline and the second flange pipeline.

10 Claims, 18 Drawing Sheets

(56) References Cited

OTHER PUBLICATIONS

Written Opinion issued in corresponding International Application No. No. PCT/CN2020/095286; dated Sep. 22, 2020; State Intellectual Property Office of the P.R. China, Beijing, China, 6pgs.

* cited by examiner

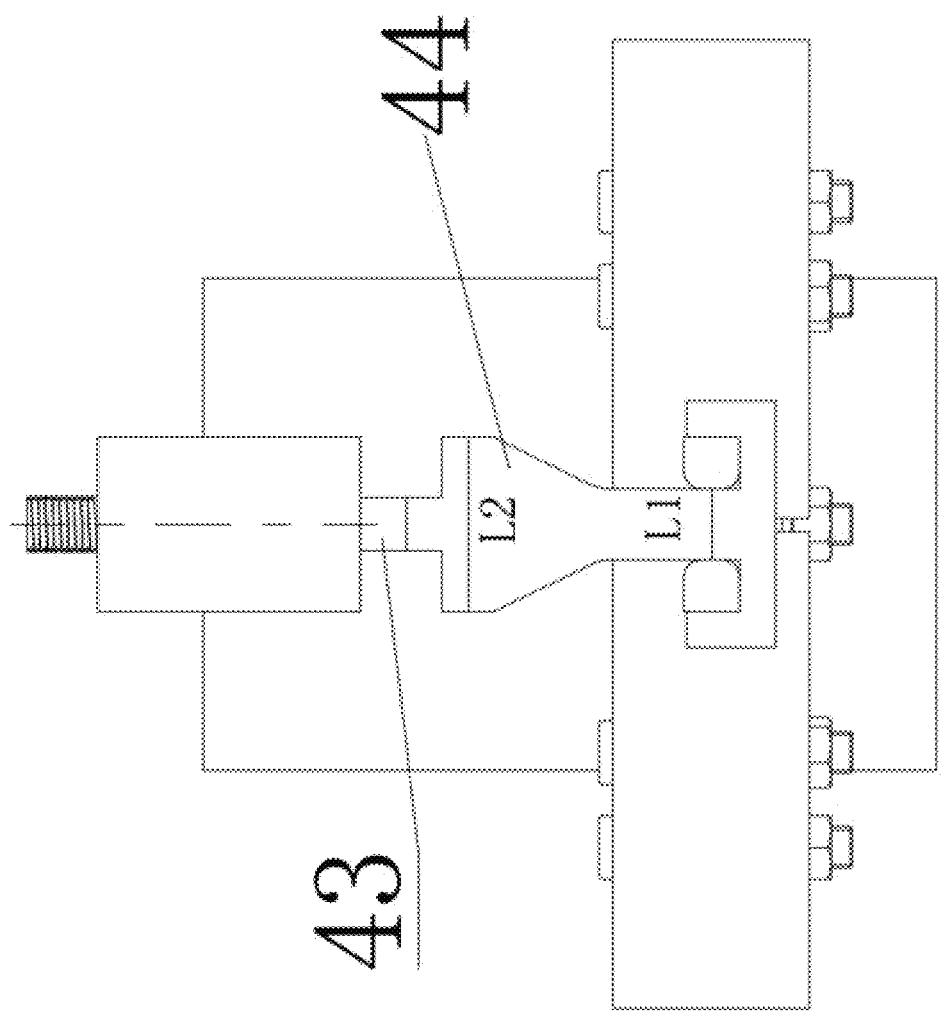

PIPELINE SEPARATION DEVICE FOR LIQUID-PROPELLANT ROCKET

RELATED APPLICATIONS

The present application is a US National Phase of International Application Number PCT/CN2020/095286 filed Jun. 10, 2020 and claims priority to Chinese Application Number 201910730746.0 filed Aug. 8, 2019.

TECHNICAL FIELD

The disclosure relates to the technical filed of liquid-propellant rocket pipeline connection, especially relates to a pipeline separation device for liquid-propellant rocket.

BACKGROUND ART

During interactive supply of fuel between a booster stage and a core stage of a liquid-propellant rocket, reliable connection and fine gas tightness are needed between pressure pipelines of different diameters. When the booster stage and the core stage being separated, the separation between pressure pipelines needs to be finished instantaneously, and the booster stage completely breaks away from hardware connection with the core stage.

Moreover, the separation action between the rocket body and the compartment also requires the main supply pipeline of propellant and the blow-down pipeline to be completely separated within milliseconds after receiving the instruction in the case of reliable connection. As for separation situations of similar application, the instant plug performance of current electrical interfaces can meet the design requirements, but the reliable separation of pressure pipelines has not been effectively solved.

There is a desperate demand to design a liquid-propellant rocket separation device with high reliability and quick response, so that launch failures caused by failed pipeline separation can be avoided.

SUMMARY OF THE DISCLOSURE

One purpose of the disclosure is to provide a pipeline separation device for liquid-propellant rocket so as to overcome at least part of the shortcomings of prior arts. This pipeline separation device can be reliably connected, and can be quickly separated when receiving a separation instruction, thereby enhancing reliability of rocket launching.

The disclosure provides a pipeline separation device for liquid-propellant rocket, comprising a first flange pipeline, a second flange pipeline, a clamping unit, a push-and-pull unit and an actuation unit; the first flange pipeline and the second flange pipeline dock with each other via a docking end surface, the clamping unit is used for limiting the first flange pipeline and the second flange pipeline at the docking end surface, and end surfaces opposite to each other after docking of the first flange pipeline and the second flange pipeline are respectively used for connecting with different medium pipelines; the push-and-pull unit comprises an actuation segment, a pushing segment and a limiting segment in sequence, the actuation segment being used for cooperating with movement of the actuation unit, and the limiting segment being used for limiting the clamping unit; the actuation unit comprises an actuation cylinder, the actuation segment being provided inside of a cavity of the actuation cylinder via a piston, and the actuation cylinder being provided with a cavity for accessing or generating air flow on an opposite side of the piston; and when the cavity of the actuation cylinder, which is located on the opposite side of the piston, accesses or generates air flow, the piston and the actuation segment are pushed to move, so that the limiting segment relieves limit on the clamping unit and the pushing segment pushes the clamping unit to break away from the docking end surface.

In one embodiment, the first flange pipeline comprises a first flange docking end located at an end portion and a first pipeline in fixed connection with the first flange docking end, and the second flange pipeline comprises a second flange docking end located at an end portion and a second pipeline in fixed connection with the second flange docking end; and the first flange docking end and the second flange docking end dock with each other, the first pipeline and the second pipeline are respectively used for fixed connection with medium pipelines.

In one embodiment, the clamping unit is a ring-shaped clamping unit circumferentially casing an outer side of the docking end surface; and the actuation unit is provided at an outer side of the first pipeline away from the first flange docking end.

In one embodiment, the ring-shaped clamping unit is provided with a cooperating unit on at least one side in a radial direction; when the first flange pipeline docks with the second flange pipeline, and the ring-shaped clamping unit circumferentially limits the docking end surface, the limiting segment cooperates with the cooperating unit to limit the ring-shaped clamping unit; the pushing segment is used for pushing the cooperating unit to drive the ring-shaped clamping unit to relieve the limit on the docking end surface during a process of relieving the limit on the docking end surface by the push-and pull unit through pushing the ring-shaped clamping unit.

In one embodiment, the ring-shaped clamping unit comprises two semicircular rings cooperating with each other, and the cooperating units are bulges respectively provided on parts adjacent to each other of the two semicircular rings; the limiting segment comprises a middle portion and two clamping portion formed from the middle portion towards both sides, and, after the two semicircular rings are clamping in place, and the two clamping portions limit the two semicircular rings by clamping the two bulges on a side away from the actuation cylinder.

In one embodiment, a cooperating size of the pushing segment is larger than a distance between the two bulges, so that the two bulges are pushed to drive the two semicircular rings to relieve the limit on the docking end surface when the pushing segment moves in a direction away from the actuation cylinder.

In one embodiment, a cooperating size of the pushing segment gradually increases in a direction from the limiting segment to the actuation segment.

In one embodiment, a spring is provided to case an outer side of the actuation segment, wherein in the cavity of the actuation cylinder, one end of the spring abuts against the surface of the piston, while the other end abuts against a surface, opposite to the piston, of the cavity where the actuation segment is provided in the actuation cylinder, and the spring is at least used for applying tensile force to the actuation segment when the limiting segment is used for limiting the clamping unit.

In one embodiment, the first flange docking end and the second flange docking end are provided with threaded holes which are circumferentially arranged, and the first flange docking end and the second flange docking end are provided with a pre-tightening bolt and a pre-tightening nut through the threaded holes so as to achieve pre-tightening with each other.

In one embodiment, the actuation cylinder is provided with a gas generator on a side of the piston away from the actuation segment, wherein the gas generator comprises ignition powder, and, after the ignition powder is ignited, a generated gas pushes the piston so as to drive the push-and-pull unit to push the clamping unit to break away from the docking end surface.

Being provided with a clamping unit on the docking end surface of flange pipelines, and by means of the cooperating action of an actuation cylinder and an actuation rod with a clamping unit, the pipeline separation device provided in the disclosure can realize reliable separation of docking pipelines, thereby enhancing reliability of rocket launching.

It should be understood that the above general description and the following embodiments are merely exemplary and illustrative, and cannot limit the scope to be claimed by the disclosure.

DESCRIPTION OF DRAWINGS

As a part of the specification, the drawings below illustrate exemplary examples of the disclosure in pictures, and the appended drawings, together with the description of the specification, are used to explain the principle of the disclosure.

FIG. 8 is a diagram showing the size relationship between the pushing segment and two bulges in one embodiment of the disclosure.

EMBODIMENTS

Various exemplary embodiments are now explained in detail, and the detailed explanation should be understood as more detailed description of certain aspects, characteristics and implementation solutions of the disclosure, rather than the limits on the disclosure.

It is obvious for a person skilled in the art that, without deviating from the scope or spirit of the preset invention, embodiments in the specification of the disclosure can be improved and changed in many different ways. Other embodiments obtained from the specification of the disclosure are obvious for technicians. The specification and examples of the present application are merely exemplary.

Figure 1:
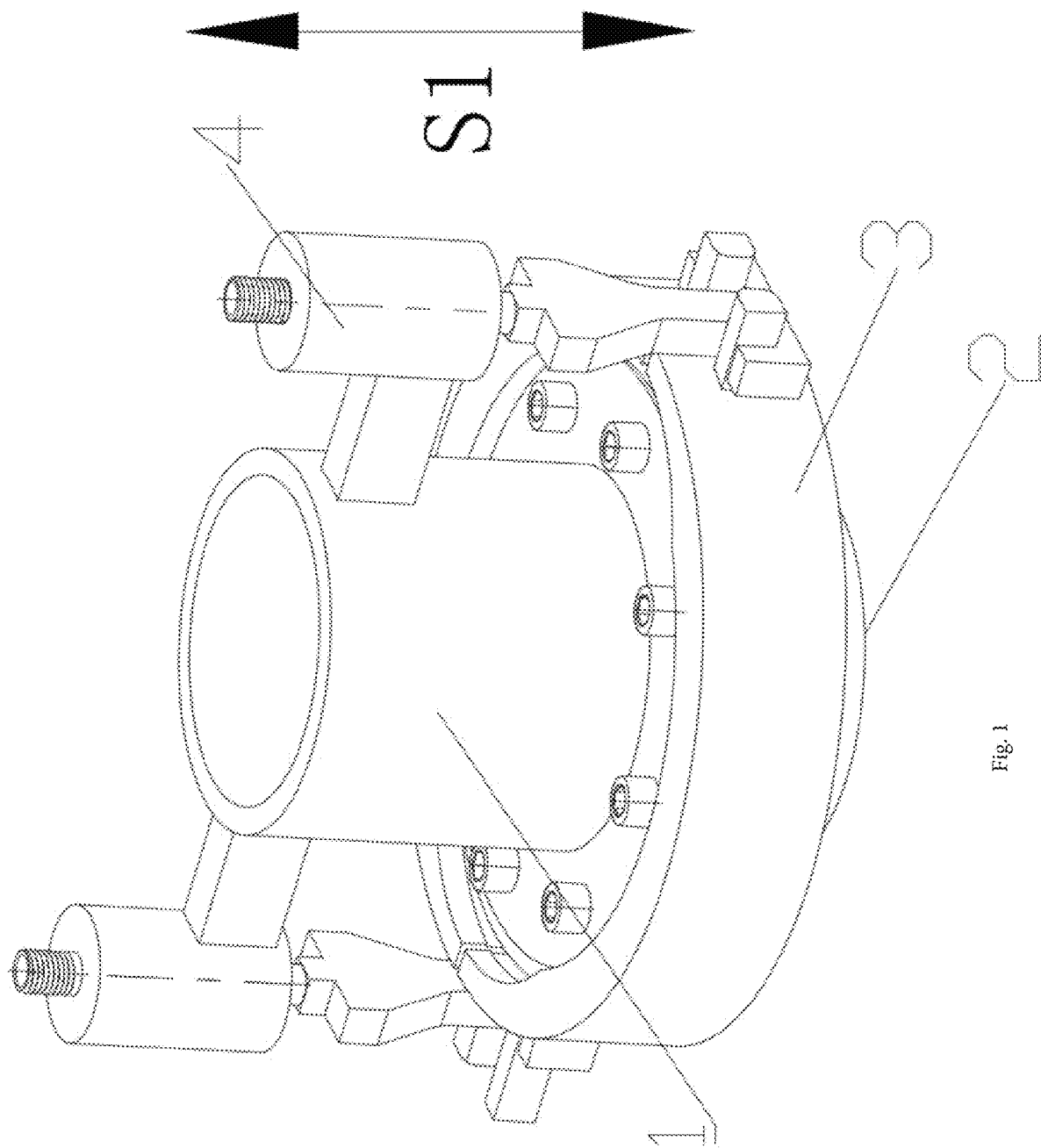
FIG. 1 is a structure diagram of the pipeline separation device in one embodiment of the disclosure.

The disclosure provides a pipeline separation device for liquid-propellant rocket. Referring to FIG. 1, the pipeline separation device comprises a first flange pipeline 1, a second flange pipeline 2, a clamping unit 3 and an actuation unit 4. The first flange pipeline 1 and the second flange pipeline 2 dock along a first direction S1, a docking end surface M (not indicated) docking each other is limited by the clamping unit 3, and end surfaces opposite to each other after docking of the first flange pipeline 1 and the second flange pipeline 2 are respectively used for connecting with different medium pipelines. The actuation unit 4 is used for making the clamping unit 3 relieve the limit on the docking end surface M. The pipeline separation device in this example of the disclosure controls the cooperative relationship between the clamping unit 3 and the docking end surface via the actuation unit 4, so as to complete quick separation of docking pipelines.

The clamping unit 3 further applies clamping force to the first flange pipeline 1 and the second flange pipeline 2 after the docking of the first flange pipeline 1 and the second flange pipeline 2, thereby avoiding medium leakage caused by dislocation of the first flange pipeline 1 and the second flange pipeline 2. The first flange pipeline 1 and the second flange pipeline 2 may be limited merely by the clamping unit 3, rather than being fastened by connection elements such as bolts and so on, thereby enhancing separation reliability.

For instance, the first direction S1 may be an axial direction of the first flange pipeline 1 and the second flange pipeline 2, namely, when they are docking along this direction, their end surfaces docking each other are in close contact, and their end surfaces opposite to each other after docking are respectively used for connecting upstream and downstream medium pipelines.

Figure 2:
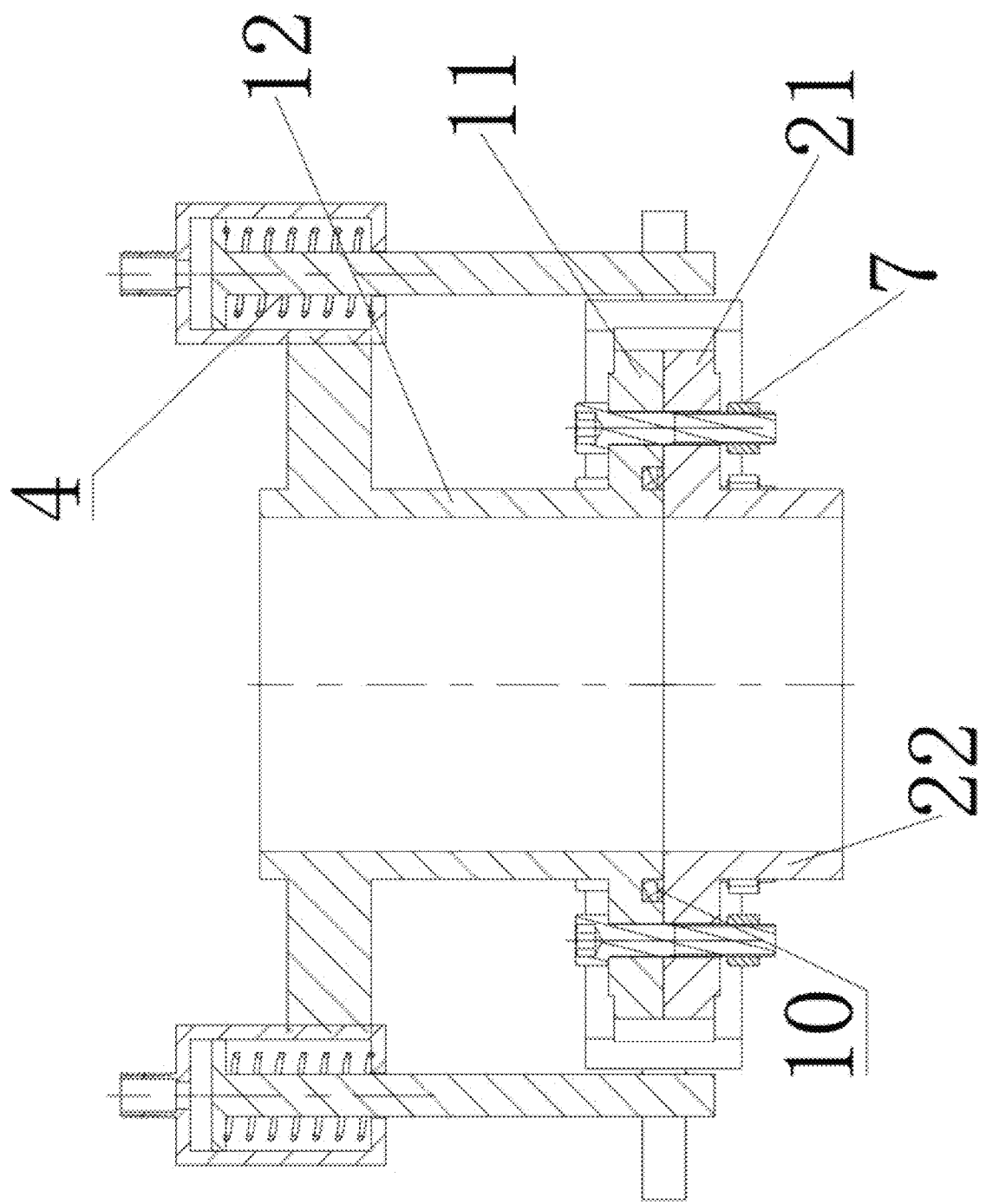
FIG. 2 and FIG. 3 are section view diagrams of FIG. 1 along a midpoint connecting line of end surfaces of two actuation cylinders.

For instance, as shown in FIG. 2, in order to avoid medium leakage, a sealing element 10 may be provided on the end surfaces docking each other. The sealing element 10, for example, may be a graphite sealing element, a rubber ring, a copper pad and a Teflon pad and so on. Multiple sealing elements, for example, may be provided at intervals on the docking end surface along the radial direction so as to enhance the sealing effect.

Still referring to FIG. 2, for instance, the first flange pipeline 1 comprises a first flange docking end 11 located at an end part and a first pipeline 12 in fixed connection with the first flange docking end 11. The second flange pipeline 2 comprises a second flange docking end 21 located at an end part and a second pipeline 22 in fixed connection with the second flange docking end 21. The first flange docking end 11 and the second flange docking end 21 dock with each other, and the first pipeline 12 and the second pipeline 22 are respectively used for fixed connection with medium pipelines. Namely, two flange pipelines both comprise a docking part and a pipeline part, which facilitates docking of the two flange pipelines, as well as welding with upstream and downstream at the same time.

Figure 3:
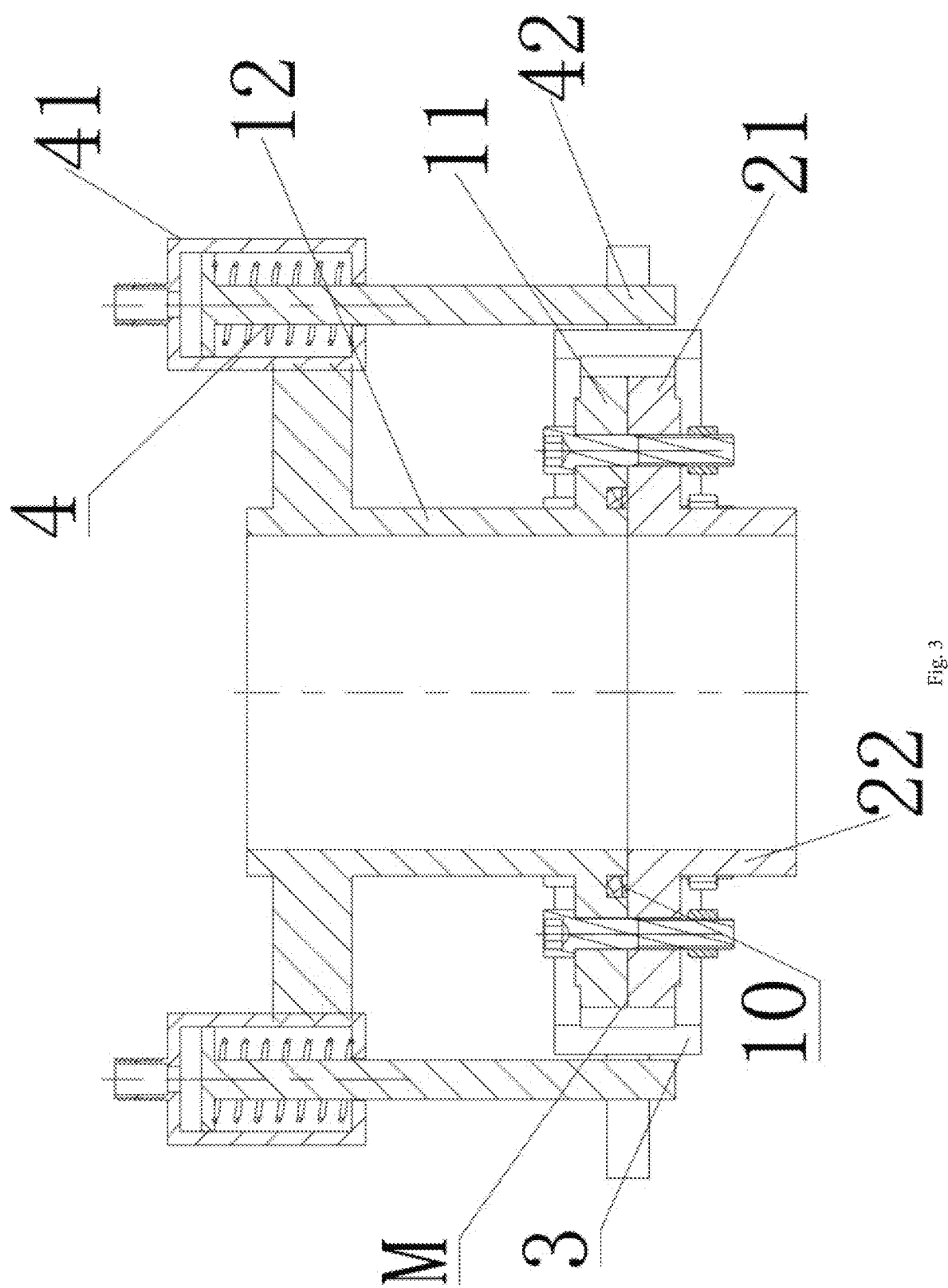

As shown in FIG. 3, the actuation unit 4 comprises an actuation cylinder 41 and an actuation rod 42, wherein the actuation cylinder 41 is provided on an outer side of the first pipeline 12 away from the first flange docking end 11 (FIG. 3 shows a radial outer side of the first pipeline, and the two actuation cylinders are symmetrically provided). For instance, an outer sidewall of the actuation cylinder 41 along its cylinder diameter can be fixedly provided with two connection rods, both ends of which are respectively in fixed connection with the actuation cylinder 41. The actuation rod 42 is used for cooperating with the clamping unit 3 so as to realize the limit on the clamping unit 3, or to push the clamping unit 3 to break away from the docking end surface M. Specifically, when the actuation rod 42 moves away from the actuation cylinder 41 under acting force of the actuation cylinder 41, the clamping unit 3 can be pushed to break away from the docking end surface (e.g. to entirely fall off from an outer side of the docking face of the first flange pipeline and the second flange pipeline), so that the first flange pipeline 1 and the second flange pipeline 2 can be automatically separated under the action of medium pressure.

Figure 4A:
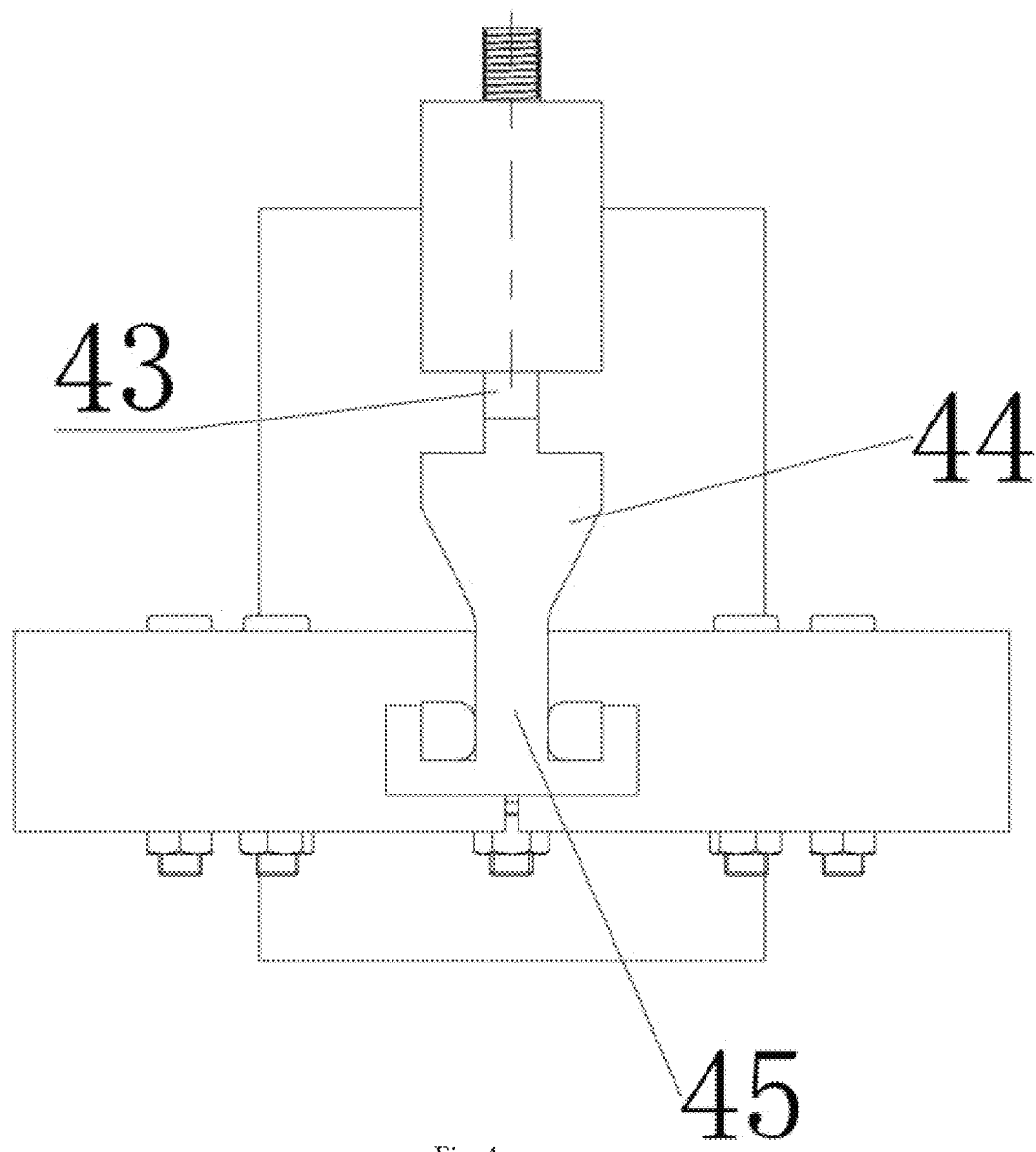
FIG. 4a is a side view structure diagram of the pipeline separation device in one embodiment of the disclosure.
Figure 4B:
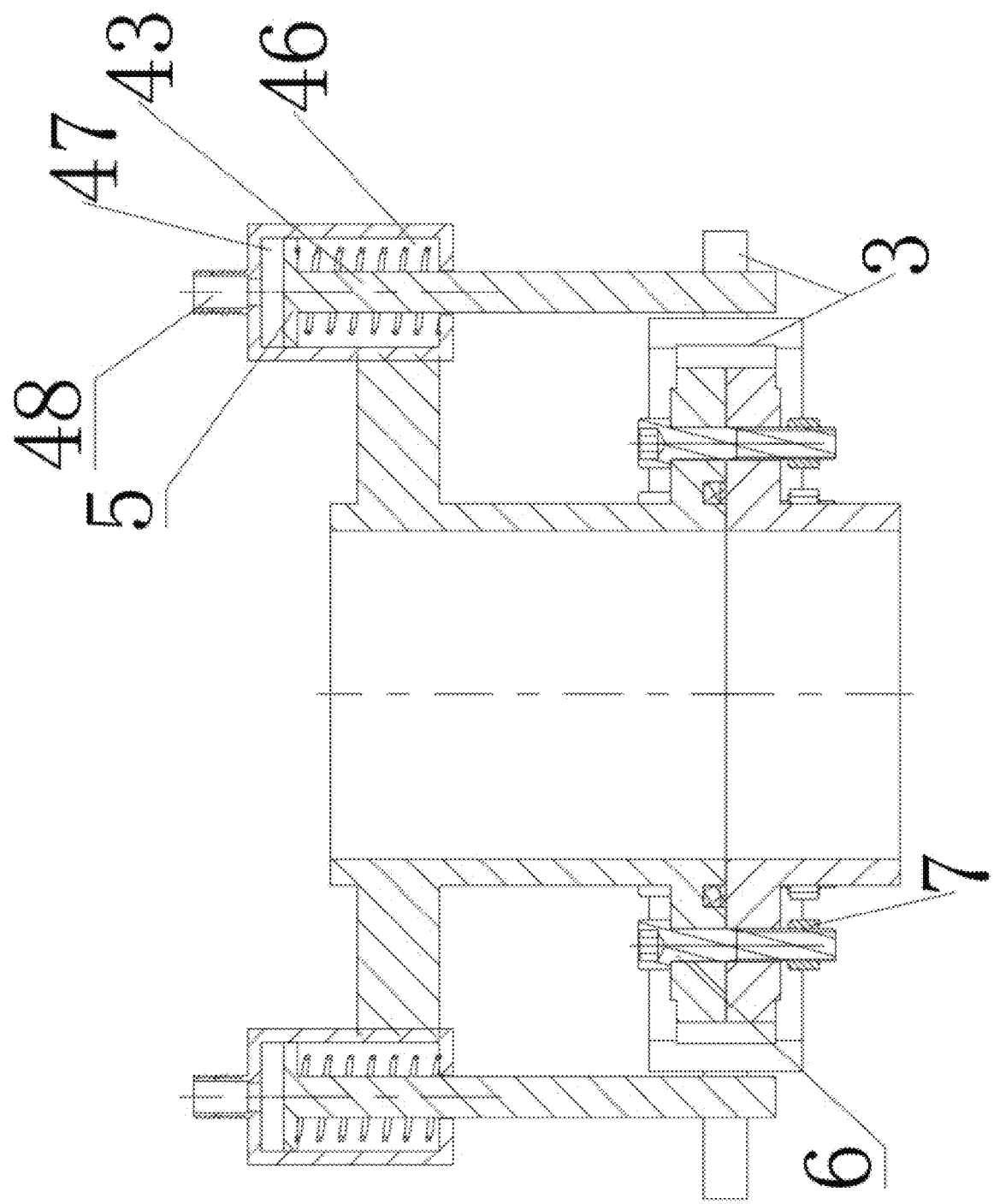
FIG. 4b is a section view diagram of FIG. 4a along a midpoint connecting line of end surfaces of two actuation cylinders.

In this example, as shown in FIGS. 4a, 4b, the actuation cylinder 41 may comprise an actuation cavity 46. The actuation rod 42 comprises an actuation segment 43, a pushing segment 44 and a limiting segment 45 in sequence. The actuation segment 43 is movably provided inside of the actuation cavity 46 via a piston 5, and the actuation cavity 46 pushes the actuation segment 43 via an actuation gas at one side of the piston 5 away from the actuation segment 43 so as to drive the pushing segment 44 and the limiting segment 45 to move, thereby changing the cooperative relationship with the clamping unit.

For instance, one end of the actuation rod 42 is provided inside of the actuation cavity via the piston 5 (e.g. one end of the actuation rod is integrally connected with the piston), and the outer edge of the piston 5 air-tightly abuts the inner wall of the actuation cylinder 41, namely, the piston 5 can make sure that there is no air leakage between cavities of the actuation cylinder 41. As shown in FIG. 4b, on the other side of the piston 5 away from the actuation rod 41, the actuation cavity 46 further comprises a small cavity 47 connected with a gas generating cavity 48. For instance, the gas generating cavity 48 can be used for accessing a high-pressure gas, so that the gas enters the small cavity 47 by entering the gas generating cavity 48 pushes the piston 5 to move, or the gas generating cavity 48 can be provided with a powder igniter, a powder generator or the like so as to form high-pressure airflow via these gas self-producing devices, thereby pushing the piston to move.

In another example, the actuation unit 4 may control actuation of the actuation cylinder via a servo device. Specifically, the actuation of the actuation unit 4 can adopt a manner of electromagnetic force, rather than a manner of gas pushing. For instance, after receiving a separation instruction, the actuation unit 4 may push the actuation rod 42 out by using electromagnetic acting force (instantly generated by powering up), so that the actuation rod 42 pushes the clamping unit 3 away from the docking end surface. For instance, the actuation unit 4 may also drive the actuation rod 42 to move via a servo motor, thereby realizing up-and-down movement of the actuation rod 42 and changing the cooperative relationship with the clamping unit 42.

Figure 5A:
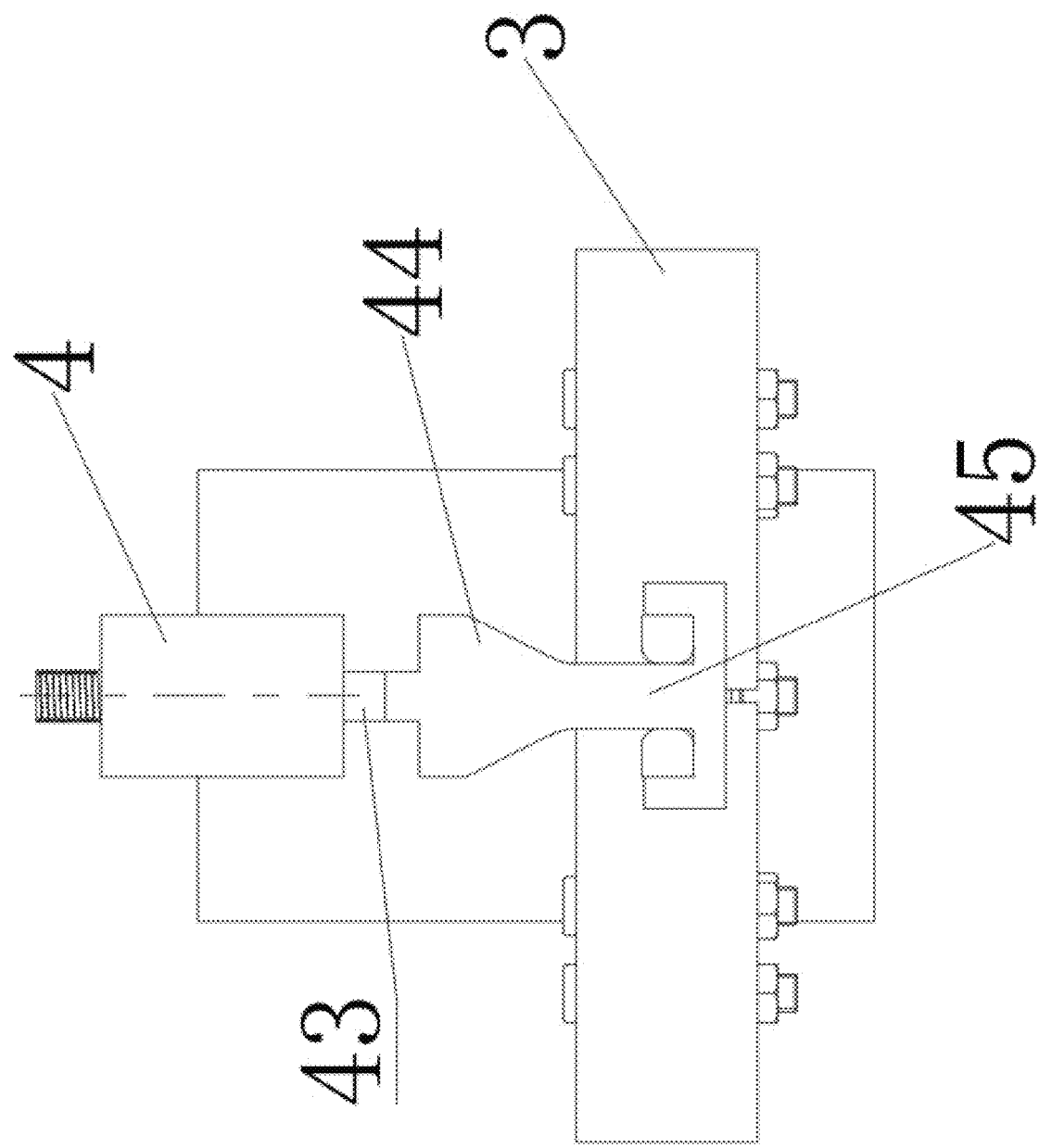
FIG. 5a is a side view structure diagram of the pipeline separation device in one embodiment of the disclosure.
Figure 5B:
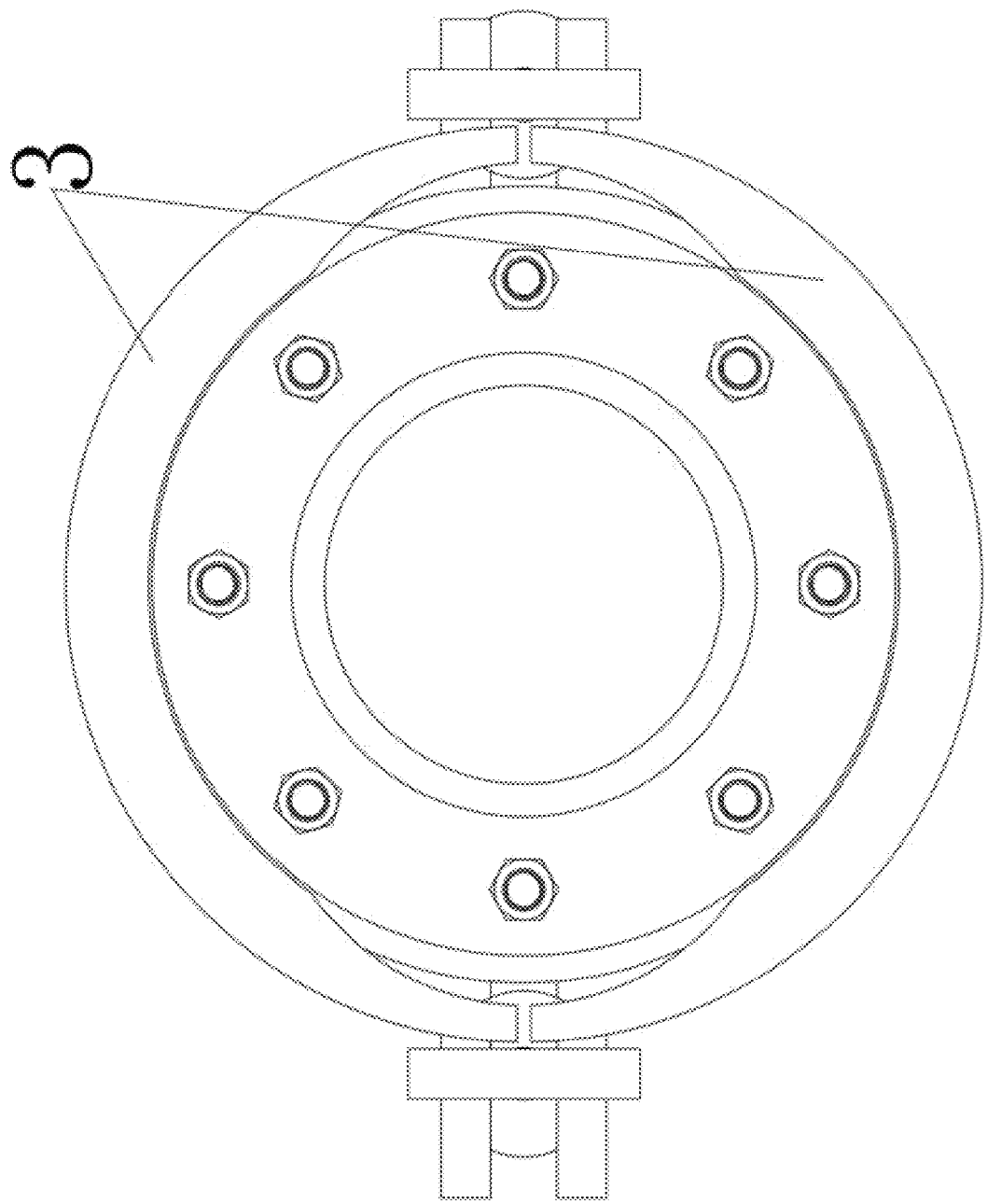
FIG. 5b is a top view structure diagram of the pipeline separation device in one embodiment of the disclosure.

In one example, as shown in FIGS. 5a and 5b, the clamping unit 3 is a ring-shaped clamping unit, and is used for being circumferentially provided on an outer side of the docking end surface M of the first flange docking end 11 and the second flange docking end 21, so as to limit the first flange docking end 11 and the second flange docking end 21 at a docking position. The ring-shaped clamping unit is provided with a cooperating unit cooperating with the actuation segment 44 and the limiting segment 45. When the ring-shaped clamping unit is provided at the position of the docking end surface M, the limiting segment 45 of the actuation rod 42 matches with a cooperating structure of the ring-shaped clamping unit right from a radial outer side of the ring-shaped clamping unit, thereby avoiding radial deviation of the ring-shaped clamping unit and ensuring docking of the flange pipelines. When the actuation rod 42 moves downwards along the direction shown in the drawings, the pushing segment 44 clamps with the cooperating unit first, and applies downwards acting force to the cooperating unit while keeps moving downwards, thereby driving the ring-shaped clamping embodiment to move downwards and break away from the docking part of the first flange pipeline 1 and the second flange pipeline 2.

Figure 6A:
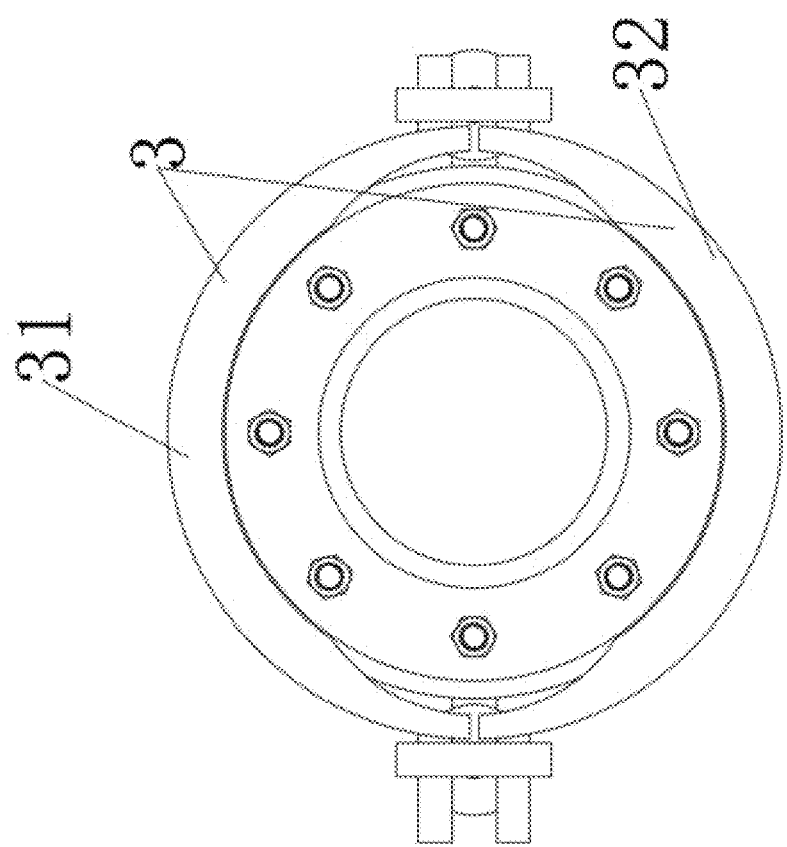
FIG. 6a is a structure diagram of the pipeline separation device, of which the clamping unit is two semicircular rings, in one embodiment of the disclosure.
Figure 6B:
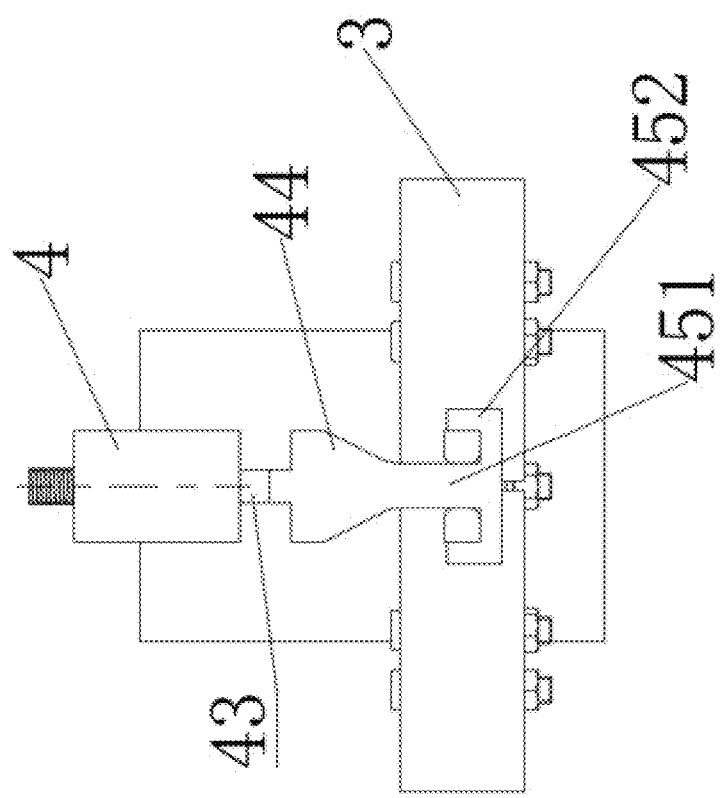
FIG. 6b is a diagram of the clamping structure for the limiting segment and the ring-shaped clamping unit in the pipeline separation device in one embodiment of the disclosure.
Figure 7:
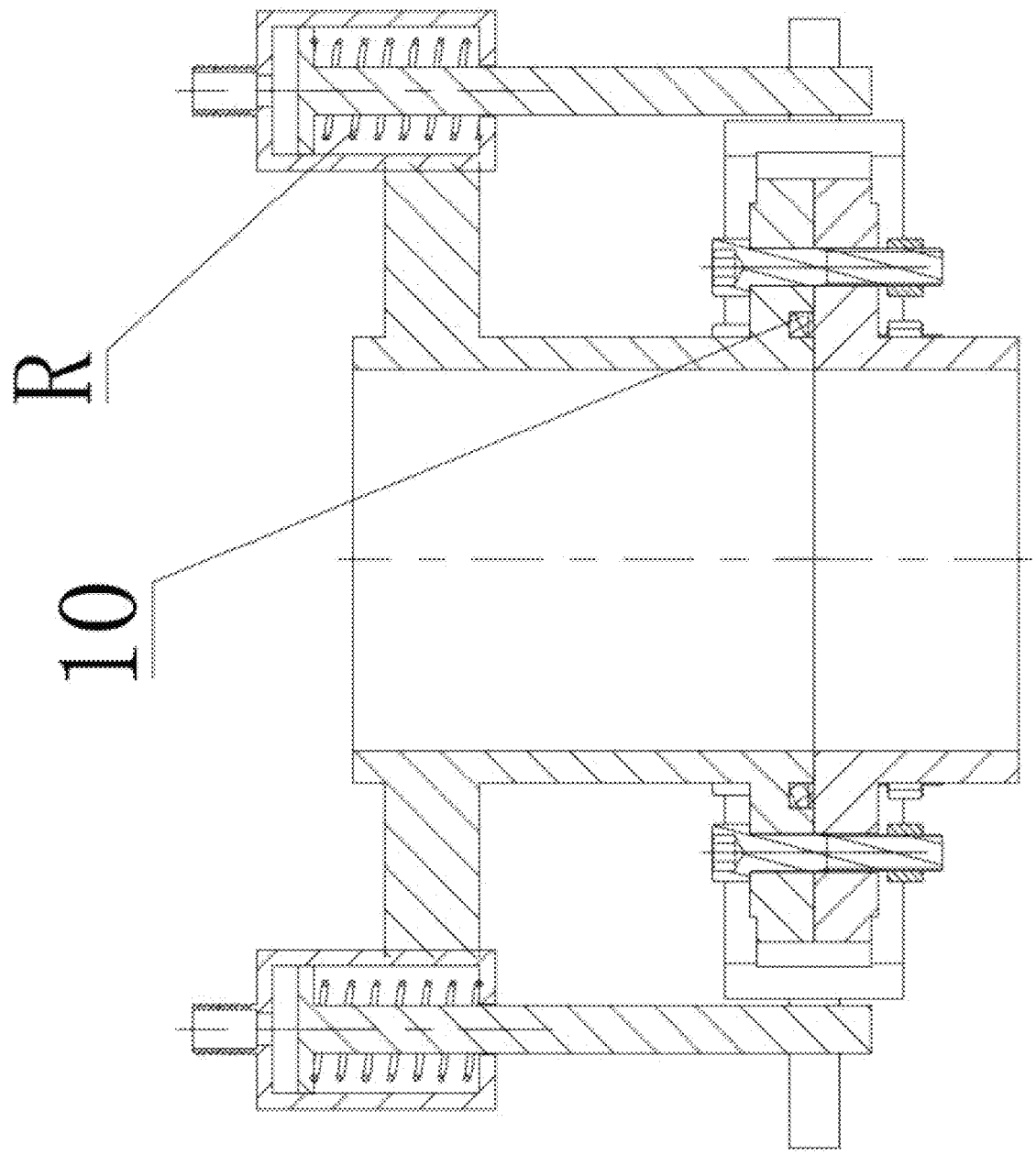
FIG. 7 is a structure diagram of the pipeline separation device, of which the actuation cylinder is provided with a spring, in one embodiment of the disclosure.

In this example, for instance, as shown in FIGS. 6a, 6b and 7, the ring-shaped clamping unit 3 comprises two semicircular rings 31, 32 cooperating with each other, and the cooperating units 33 are bulges respectively provided on parts adjacent to each other of the two semicircular rings. The limiting segment 45 comprises a middle part 451 and two clamping parts 452 formed from the middle part towards both sides. After the two semicircular rings 31, 32 are clamped in place, the two clamping parts 452 limit the two semicircular rings 31, 32 by clamping the two bulges on a side away from the actuation cylinder 41.

In some examples, in order to avoid the ring-shaped clamping unit' failure to fall off, the ring-shaped clamping unit may be formed of four ¼ circular rings, and two sets of corresponding actuation cylinders and actuation rods may be provided accordingly, wherein these two sets of mechanisms right form a cross line passing through the center of the circle seen from the top view. Because the central angles of each circular ring further decreases, the occurrence of stuck can be avoided when the actuation rod pushes the clamping unit to move, thereby further enhancing reliability of pipeline separation.

As shown in FIG. 7, when a spring R is provided on one side of the actuation cavity 46 which adjacent to the piston 5, the spring R may apply tensile force to the limiting segment 45 when the limiting segment 45 clamps the two bulges, so that the part of the limiting segment 45 close to the two semicircular rings 31, 32 closely fits the surface of the two semicircular rings, and the two bulges limit the upward movement of the limiting segment 45.

For instance, the size of the two semicircular rings from the middle part towards two ends gradually decreases (for instance, along the circumferential direction of the semicircle, an axial size of the semicircular ring from its middle part towards the edge gradually decreases), so as to ensure that the two ends of the semicircular rings can quickly break away from the flange pressing surface when the clamping unit 3 is removed.

For instance, as shown in FIG. 8, a cooperating size L2 of the pushing segment 44 is larger than a distance L1 between the two bulges. Namely, when the pushing segment moves downwards, its size L2 in a connecting line direction of the two bulges is larger than the distance L1 between the two bulges, so that the pushing segment 44 may apply acting force to the two bulges when moving downwards. Further, the pushing segment 44 has a structure with a gradually expanding size in a direction from the limiting segment 45 towards the actuation segment 43, e.g. the two sides of the pushing segment 44 cooperating with the two bulges has a structure of inclined plane. By virtue of the gradually increasing size of the pushing segment 44, the stress effect of the pushing segment and the bulges can be improved, so that the pushing segment can smoothly push the ring-shaped clamping unit.

In one example, the actuation segment 43 may be provided inside of the actuation cavity 46 via a spring used for applying tensile force to the actuation rod 42 when the limiting segment 45 limits the clamping unit 3. For instance, the spring may be in a natural state when the actuation rod 42 is located at the topmost end (i.e. the distance between the limiting segment and the actuation cylinder is minimum), so that the spring may apply tensile force to the actuation rod 42 when the actuation rod 42 is pulled downwards.

The above examples can be combined with each other, and can produce corresponding technical effects.

Being provided with a clamping unit on a docking end surface of the flange pipelines and by virtue of cooperating actions of the actuation cylinder and the actuation rod with the clamping unit, the pipeline separation device in each of the examples of the disclosure can realize reliable separation of docking pipelines, thereby enhancing reliability of rocket launching.

Some examples of the disclosure further provide a method for docking liquid-propellant rocket pipeline. For instance, as shown in FIGS. 9a-9d, this method may comprise steps of:

S1: Providing a first flange pipeline 1, a second flange pipeline 2, a ring-shaped clamping unit 3 and an actuation unit 4; wherein the actuation unit 4 comprises an actuation cylinder 41 and an actuation rod 42, one end of the actuation rod 42 is provided inside of a cylinder cavity 46 of the actuation cylinder 41 via a piston 5, and the cylinder cavity 46 is provided with a spring-back element on one side of the piston 5 close to the actuation rod 42.

Figure 9A:
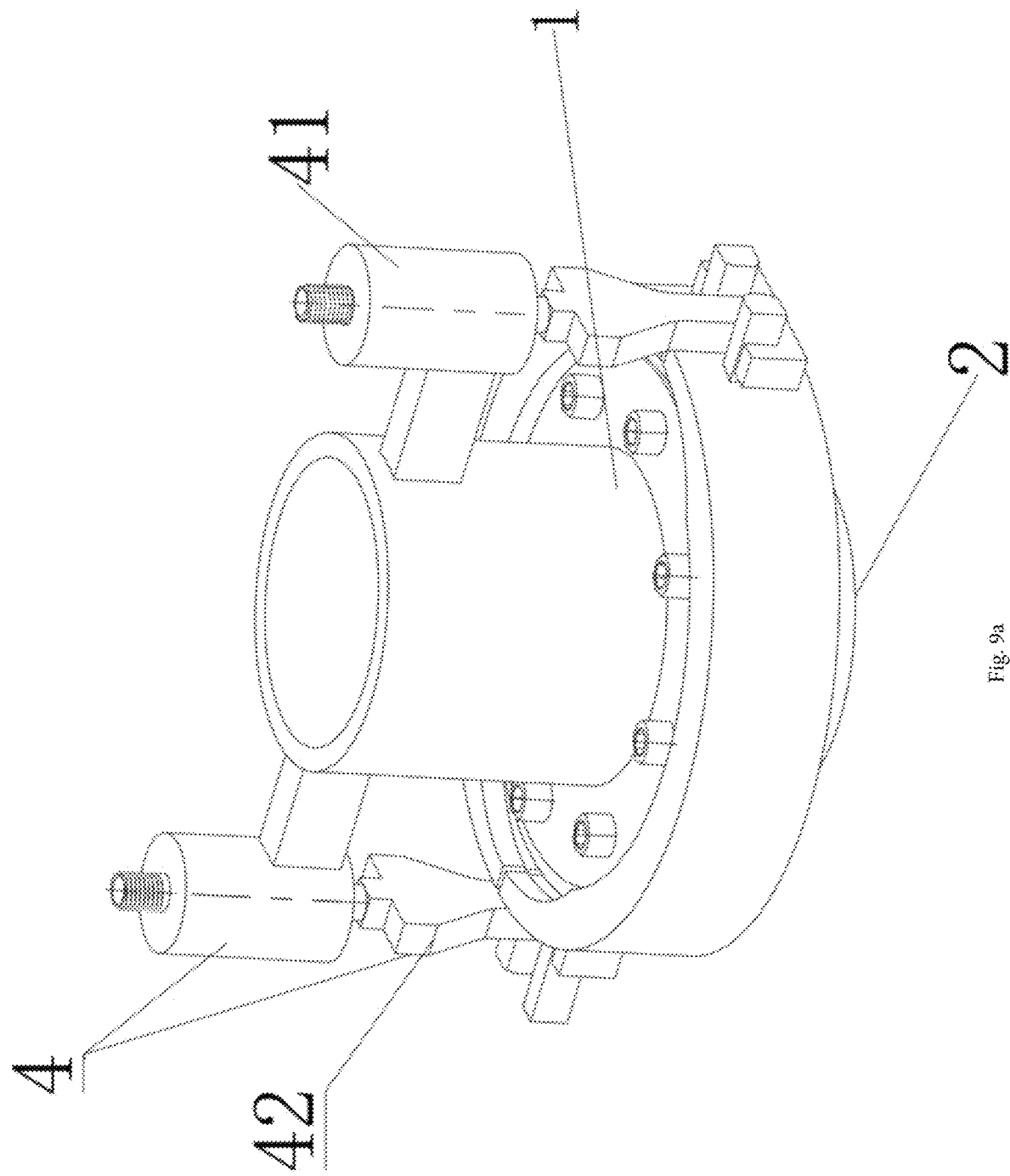
FIGS. 9a-9d are diagrams of the pipeline separation device, which is in a specific combination state, in one embodiment of the disclosure.
Figure 9B:
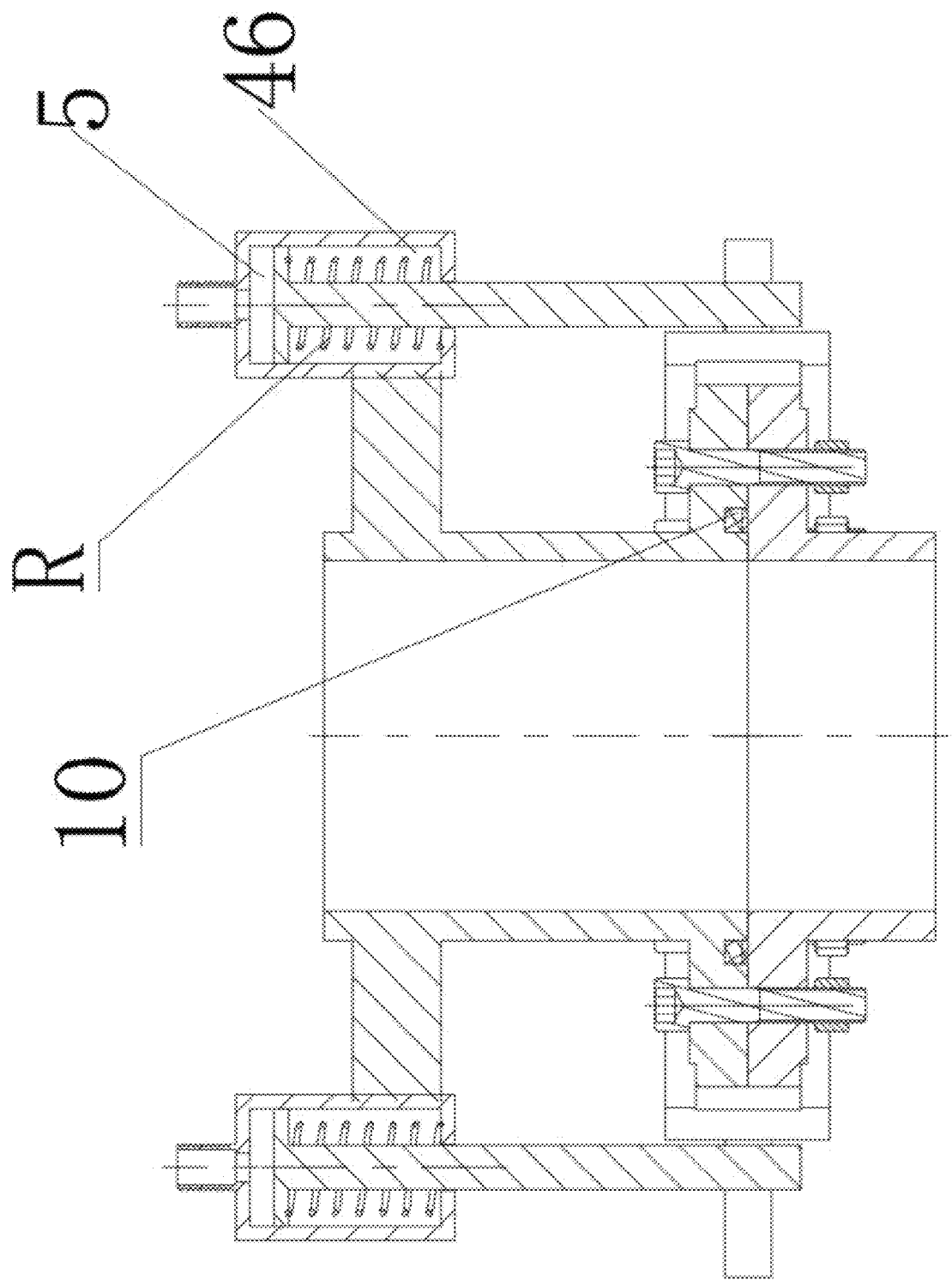
Figure 9C:
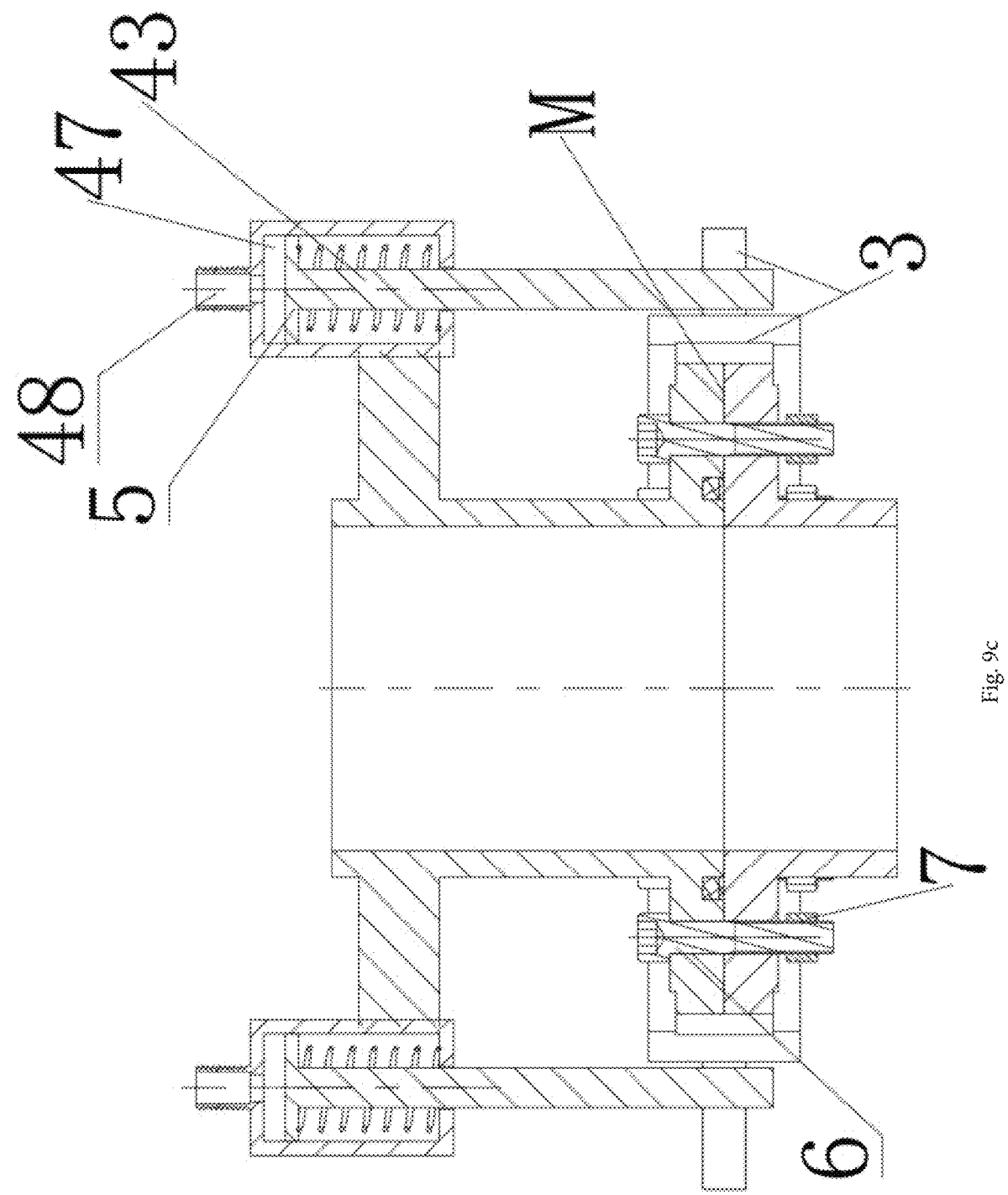

For instance, as shown in FIG. 9b, the spring-back element may be a spring R.

S2: Docking the first flange pipeline 1 and the second flange pipeline 2, and applying pre-tightening force to a docking end surface M; and for instance, prior to docking the first flange pipeline 1 and the second flange pipeline 2, providing a graphite sealing pad on a docking surface of the first flange pipeline 1.

For instance, the first flange pipeline 1 comprises a first flange docking end 11 located at an end part and a first pipeline 12 in fixed connection with the first flange docking end 11, and the second flange pipeline 2 comprises a second flange docking end 21 located at an end part and a second pipeline 22 in fixed connection with the second flange docking end 21, wherein the first pipeline docking end 11 and the second flange pipeline end 21 are provided with matching threaded holes. The step of docking the first flange pipeline 1 and the second flange pipeline 2, and applying pre-tightening force to the docking end surface M comprise:

applying pre-tightening force to the docking end surface M by screwing a pre-tightening bolt 6 and a pre-tightening nut 7 into the threaded holes after docking the first flange docking end 11 and the second flange docking end 21.

Still referring to FIG. 9a, S3: Pulling the actuation rod to a position not interfering with the docking end surface, and casing the docking end surface of the first flange pipeline and the second flange pipeline within the ring-shaped clamping unit; and for instance, the actuation rod 42 comprises an actuation segment 43, a pushing segment 44 and a limiting segment 45 in sequence, and the step of pulling the actuation rod 42 to the position not interfering with the docking end surface comprises:

stretching the limiting segment to a first position, wherein the first position is a position in which the limiting segment and the pushing segment do not interfere with the cooperating structure and the cooperating unit is located between the limiting segment and the pushing segment after casing the docking end surface with the ring-shaped clamping unit. That is, the actuation rod 2 is pulled to a position which does not affect installation of the ring-shaped clamping unit 3.

Figure 9D:
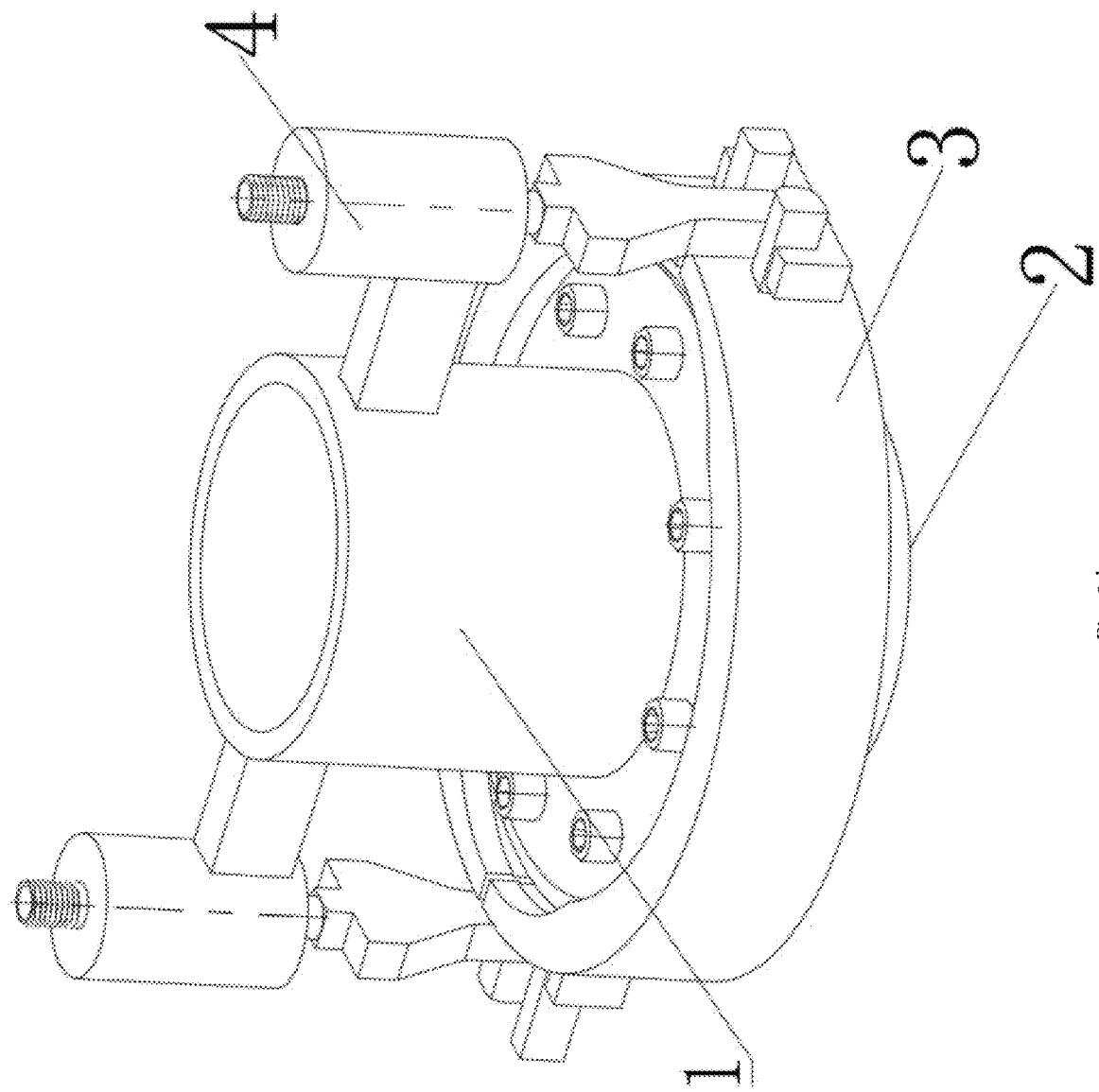

S4: Relieving the actuation rod so that the actuation rod clamps the cooperating unit on a radial outer side of the ring-shaped clamping unit under the action of the spring-back element, thereby limiting the ring-shaped clamping unit (as shown in FIG. 9d).

The cooperating unit is two bulges provided on the radial outer side of the ring-shaped clamping unit, wherein the two bulges are spaced from each other; and the limiting segment 44 comprises a middle part 451 and a U-shaped structure 452 formed from the middle part 451 towards both sides.

The step S4, i.e. relieving the actuation rod 42 so that the actuation rod 42 clamps the cooperating unit on a radial outer side of the ring-shaped clamping unit 3 under the action of the spring-back element, thereby limiting the ring-shaped clamping unit 3, comprises:

making the U-shaped structure 452 clamp the two bulges from a side of the two bulges away from the actuation cylinder 41 so as to limit spring-back of the U-shaped structure 452, so that the U-shaped structure 452 applies limiting force to the ring-shaped clamping unit 3 from an outer side of the ring-shaped clamping unit 3 under the tensile force of the spring-back element.

When the docking end surface is pre-tightened by the pre-tightening bolt and the pre-tightening nut, after the above step S4 of relieving the actuation rod so that the actuation rod 42 is clamped with the cooperating unit on a radial outer side of the ring-shaped clamping unit 3 under the action of the spring-back element, thereby limiting the ring-shaped clamping unit 3, the following step may comprise: dismounting the pre-tightening bolt 6 and the pre-tightening nut 7.

The above docking method further comprises steps of: connecting the first pipeline 12 with an upstream medium pipeline via welding, and connecting the second pipeline 22 with a downstream medium pipeline via welding.

In a case wherein the ring-shaped clamping unit 3 is two semicircular rings, and the two semicircular rings are structures with a gradually decreasing size from the middle part towards both ends, the step of pulling the actuation rod 42 to a position not interfering with the docking end surface M, and casing the docking end surface M of the first flange pipeline 1 and the second flange pipeline 2 within the ring-shaped clamping unit 3 comprises:

providing the two semicircular rings in matching positions on the docking end surface M, and abutting the ends of two semicircular rings with each other so as to form a ring-shaped clamping unit 3.

Figure 10A:
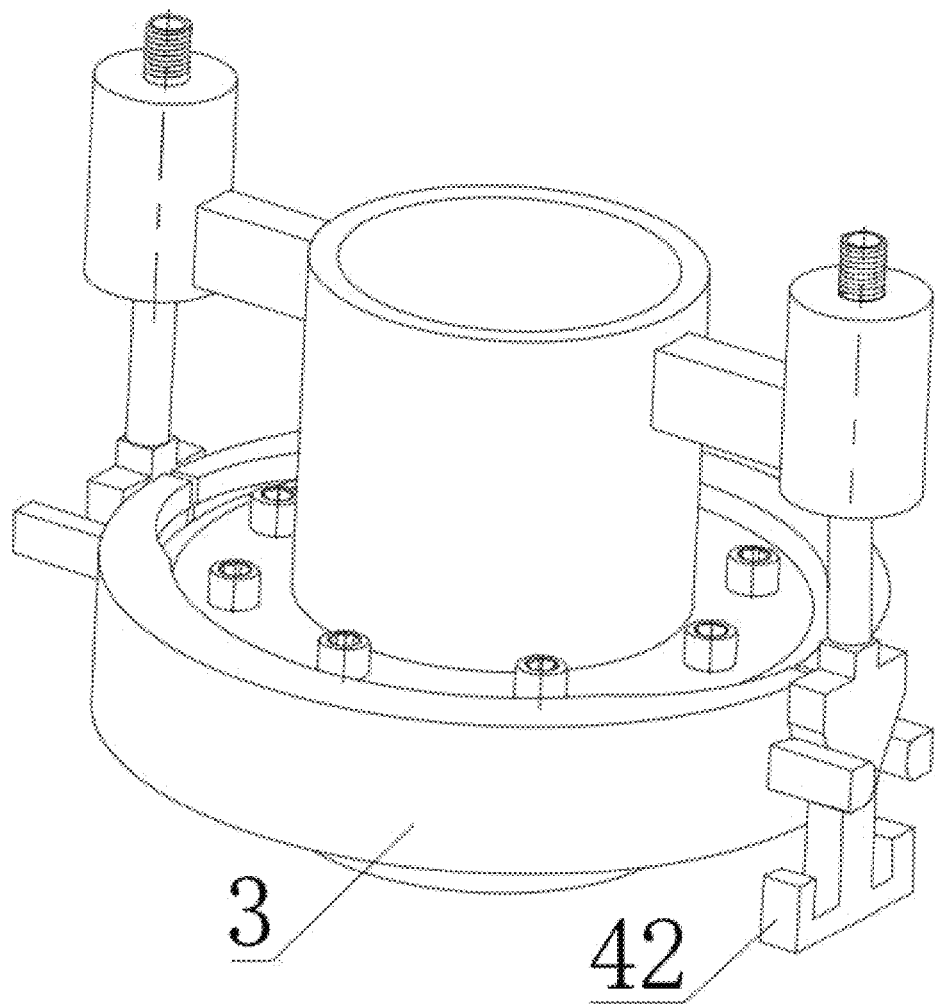
FIGS. 10a-10c are diagrams showing the separation process of the pipeline separation device in one embodiment of the disclosure.
Figure 10B:
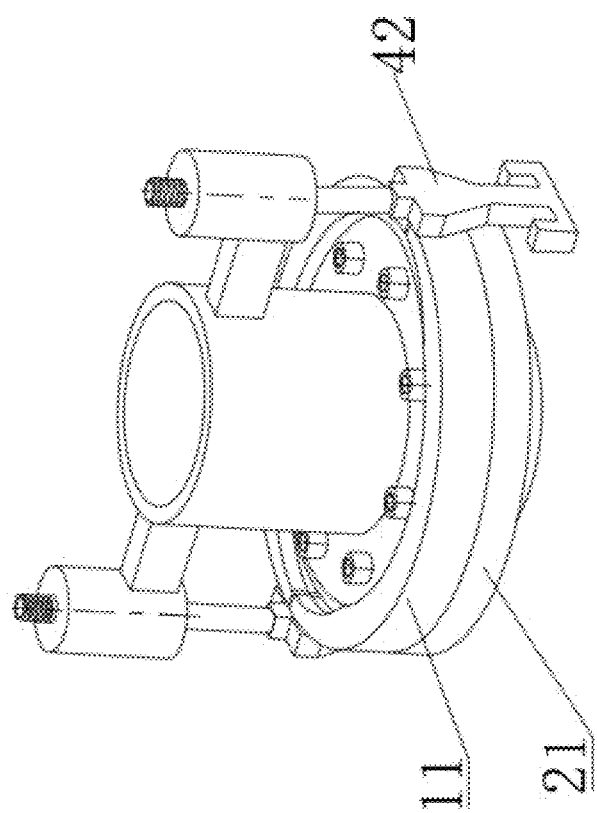
Figure 10C:
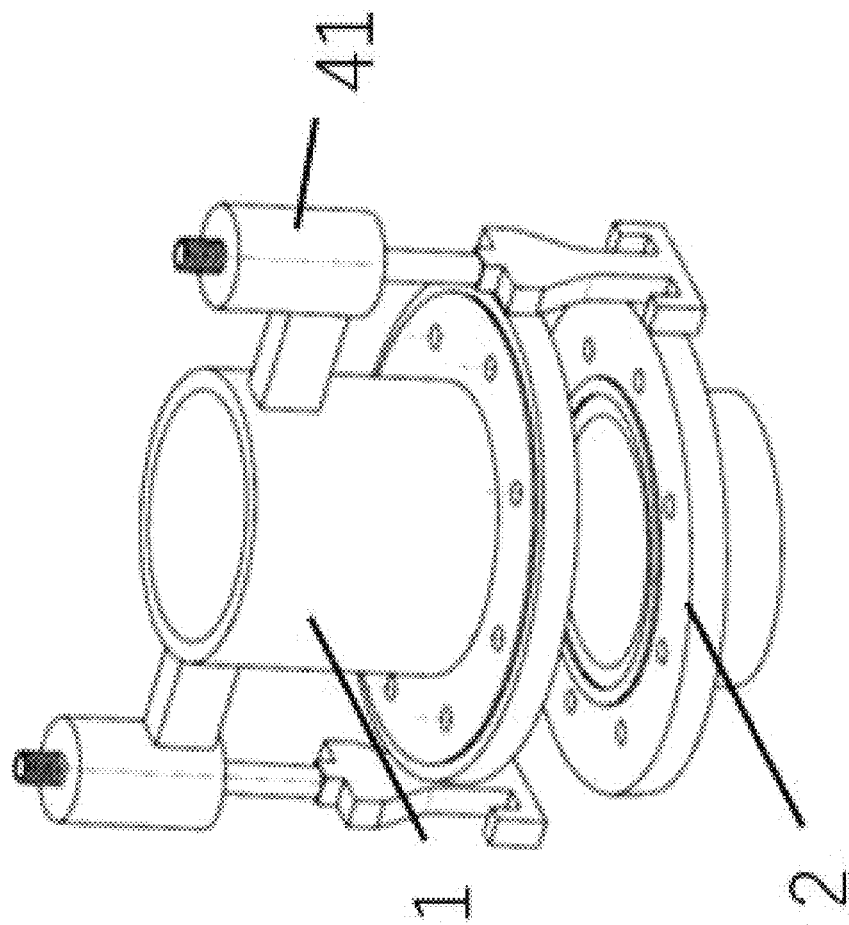

The disclosure further provides a method for separating liquid-propellant rocket pipeline in correspondence to the above docking method, as shown in FIGS. 10a-10c, the method comprises a step of: making a high-pressure gas enter into a cavity at the other side of a piston 5 so as to push the actuation rod 42 to drive the ring-shaped clamping unit 3 to break away from the docking end surface M.

When the cavity of the actuation cylinder 41 is provided with an ignition device at the other side of the piston 5, the step of making a high-pressure gas enter into a cavity at the other side of a piston so as to push the actuation rod to drive the ring-shaped clamping unit to break away from the docking end surface comprises:

the ignition device receives an ignition signal to ignite, thereby generating a high-pressure gas, wherein the high-pressure gas enters into a cavity at the other side of a piston so as to push the actuation rod to drive the ring-shaped clamping unit to break away from the docking end surface.

FIG. 10a shows a diagram when the actuation cylinder 41 actuates and the actuation rod 42 moves downwards and pressurizes two bulges of the ring-shaped clamping unit. In FIG. 10b, the ring-shaped clamping unit is pushed by the actuation rod 42 to break away from the docking end surface of the first flange pipeline 1 and the second flange pipeline 2. In FIG. 10c, the first flange pipeline 1 and the second flange pipeline 2 are separated from each other under the action of medium pressure.

The afore-mentioned are merely schematic embodiments of the disclosure. Equivalent variations and modifications, made by any person skilled in this field and without deviating from the conception and principle of the disclosure, shall all belong to the scope of protection claimed by the disclosure.

The invention claimed is:

1. A pipeline separation device for liquid-propellant rocket, comprising a first flange pipeline, a second flange pipeline, a clamping unit, a push-and-pull unit and an actuation unit;
   wherein the first flange pipeline and the second flange pipeline dock with each other via a docking end surface, the clamping unit is used for limiting the first flange pipeline and the second flange pipeline at the docking end surface, and end surfaces opposite to each other after docking of the first flange pipeline and the second flange pipeline are respectively used for connecting with different medium pipelines;
   the push-and-pull unit comprises an actuation segment, a pushing segment and a limiting segment in sequence, the actuation segment being used for cooperating with movement of the actuation unit, and the limiting segment being used for limiting the clamping unit;
   the actuation unit comprises an actuation cylinder, the actuation segment being provided inside of a cavity of the actuation cylinder via a piston, and the actuation cylinder being provided with a cavity for accessing or generating air flow on an opposite side of the piston; and
   when the cavity of the actuation cylinder, which is located on the opposite side of the piston, accesses or generates air flow, the piston and the actuation segment are pushed to move, so that the limiting segment relieves limit on the clamping unit and the pushing segment pushes the clamping unit to break away from the docking end surface.

2. The pipeline separation device for liquid-propellant rocket according to claim 1, wherein the first flange pipeline comprises a first flange docking end located at an end portion and a first pipeline in fixed connection with the first flange docking end, and the second flange pipeline comprises a second flange docking end located at an end portion and a second pipeline in fixed connection with the second flange docking end; and
   the first flange docking end and the second flange docking end dock with each other, and the first pipeline and the second pipeline are respectively used for fixing connection with medium pipelines.

3. The pipeline separation device for liquid-propellant rocket according to claim 2, wherein the clamping unit is a ring-shaped clamping unit circumferentially casing an outer side of the docking end surface; and the actuation unit is provided at an outer side of the first pipeline away from the first flange docking end.

4. The pipeline separation device for liquid-propellant rocket according to claim 3, wherein the ring-shaped clamping unit is provided with a cooperating unit on at least one side of a radial direction; and
   when the first flange pipeline docks with the second flange pipeline, and the ring-shaped clamping unit circumferentially limits the docking end surface, the limiting segment cooperates with the cooperating unit to limit the ring-shaped clamping unit; the pushing segment is used for pushing the cooperating unit to drive the ring-shaped clamping unit to relieve the limit on the docking end surface during a process of relieving the limit on the docking end surface by the push-and-pull unit through pushing the ring-shaped clamping unit.

5. The pipeline separation device for liquid-propellant rocket according to claim 4, wherein the ring-shaped clamping unit comprises two semicircular rings cooperating with each other, and the cooperating units are bulges respectively provided on portions adjacent to each other of the two semicircular rings; and
   the limiting segment comprises a middle portion and two clamping portion formed from the middle portion towards both sides, and, after the two semicircular rings are clamped in place, the two clamping portions limit the two semicircular rings by clamping the two bulges on a side away from the actuation cylinder.

6. The pipeline separation device for liquid-propellant rocket according to claim 4, wherein a cooperating size of the pushing segment is larger than a distance between the two bulges, so that the two bulges are pushed to drive the two semicircular rings to relieve the limit on the docking end surface when the pushing segment moves in a direction away from the actuation cylinder.

7. The pipeline separation device for liquid-propellant rocket according to claim 6, wherein a cooperating size of the pushing segment gradually increases in a direction from the limiting segment to the actuation segment.

8. The pipeline separation device for liquid-propellant rocket according to claim 2, wherein the first flange docking end and the second flange docking end are provided with threaded holes which are circumferentially arranged, and the first flange docking end and the second flange docking end are provided with a pre-tightening bolt and a pre-tightening nut through the threaded holes so as to achieve pre-tightening with each other.

9. The pipeline separation device for liquid-propellant rocket according to claim 1, wherein a spring is provided to case an outer side of the actuation segment, in the cavity of the actuation cylinder, one end of the spring abuts against the surface of the piston, while the other end abuts against a surface, opposite to the piston, of the cavity in the actuation cylinder where the actuation segment are provided, and the spring is at least used for applying tensile force to the actuation segment when the limiting segment is used for limiting the clamping unit.

10. The pipeline separation device for liquid-propellant rocket according to claim 1, wherein the actuation cylinder is provided with a gas generator on a side of the piston away from the actuation segment, the gas generator comprises ignition powder, and, after the ignition powder is ignited, a generated gas pushes the piston so as to drive the push-and-pull unit to push the clamping unit to break away from the docking end surface.

\* \* \* \* \*